April 17, 1962 W. H. LUCKE 3,030,521
MAGNETIC CORE BINARY COUNTER
Filed May 29, 1958
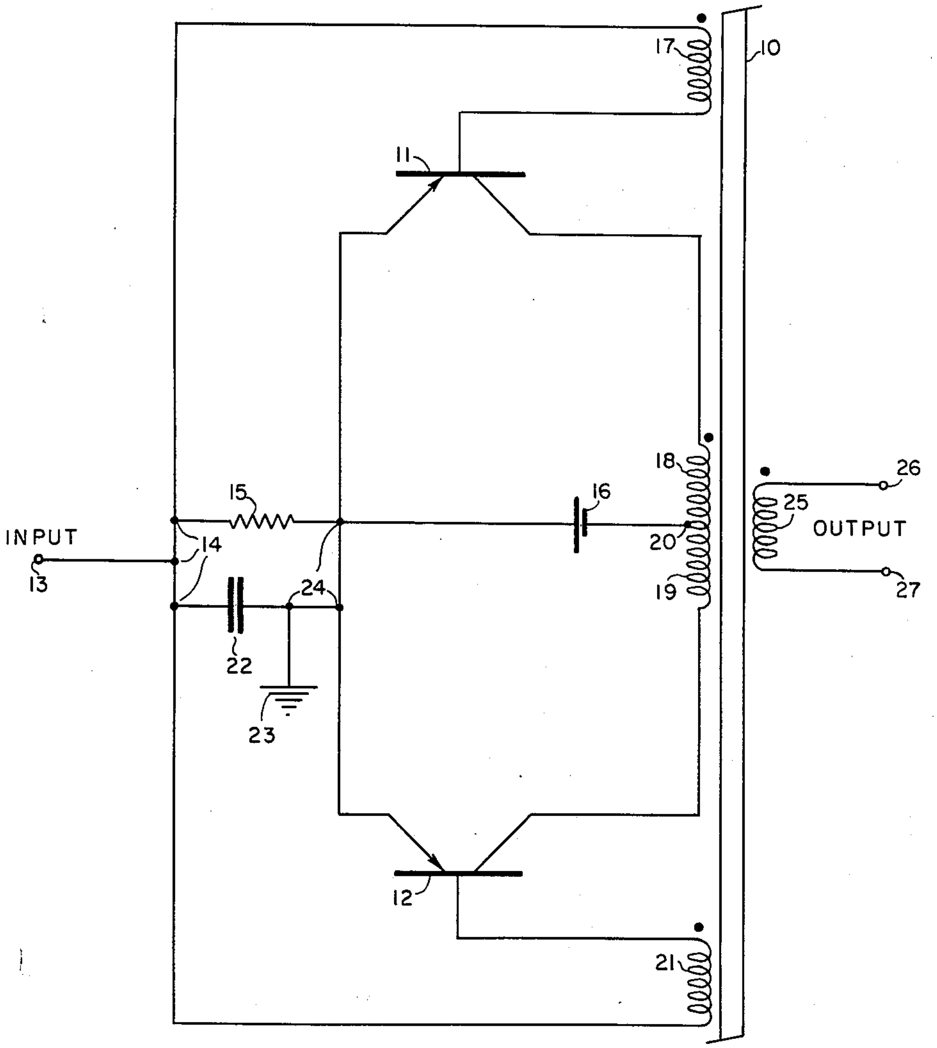
INVENTOR
WILLIAM H. LUCKE
BY Richard E. Reed
ATTORNEYS United States Patent Office 3,030,521

Patented Apr. 17, 1962

3,030,521

MAGNETIC CORE BINARY COUNTER

William H. Lucke, Moores Lane, R.R. 3, Box 170, Clinton, Md.

Filed May 29, 1958, Ser. No. 738,902
2 Claims. (Cl. 307—88)
(Granted under Title 35, U.S. Code (1952), sec. 266)

The invention described herein may be manufactured and used by or for the Government of the United States of America for governmental purposes without the payment of any royalties thereon or therefor.

This invention relates to binary counter circuits and more particularly to binary counting circuits using rectangular hysteresis loop magnetic cores and transistors.

In the miniaturization of electronic equipment, the problems of stability have increased. Miniaturization requires that the power consumption, the number of components, the need for maintenance and the weight of the equipment be kept at their minimum limits. Also, a low output impedance is very much desired. These problems have been adequately resolved in the binary circuit of this invention by the use of a rectangular hysteresis loop magnetic core as the binary element and by the use of transistors as switches.

It is, therefore, an object of this invention to provide a miniaturized binary counting circuit with a high degree of stability.

Another object of this invention is to provide a binary counting circuit in which the power consumption requirements are at a minimum.

Still another object is to provide a binary counter with a low impedance output.

Another object is to provide a binary counter comprising a minimum number of components.

A further object is to provide a binary counter which requires an absolute minimum of maintenance.

A still further object of this invention is to provide a binary counting circuit in which the binary element is a rectangular hysteresis loop magnetic core.

A final object is to provide a binary counter in which the switches are transistors.

These and other features of the invention, as well as additional objects therefor, will become apparent by reference to the ensuing description and the accompanying drawings in which:

The drawing is a schematic diagram of the magnetic core binary counting circuit of this invention.

In accordance with the basic teachings of the present invention, a simplified counting circuit is provided which requires as essential elements a coupling transformer, two transistors, a capacitor and a relatively simple power source. The coupling transformer comprises a center tapped driving winding and two transistors switch control windings placed upon a core composed of high remanence material having "rectangular-loop" hysteresis characteristics. A core composed of such material, which is somewhat similar to a permanent magnet in certain of its characteristics, can be driven to saturation in either of two polarities by a suitable driving signal applied to the center tapped winding thereon. Upon removal of this driving signal, however, the core does not return to an unmagnetized condition, as does ordinary transformer core material, for example, but assumes a condition of magnetism somewhat lower than saturation, called: remanence, which thereafter is retained indefinitely or until forceably removed by a driving signal of opposite polarity to that of the original driving signal. The control windings are sensitive to the polarity of the flux change in the core to select which one of the transistor switches is to be closed to provide the proper polarity to the driving winding to change the flux in the core from one state of saturation to the other. The pulse produced by the fall of the flux alignment in the core from saturation to remanence of the same polarity is sufficient in magnitude and polarity to close the transistor switch which was open during the just completed change of flux alignment in the core and to open the transistor switch which was closed during the same interval. This is the operation desired to provide the operation of a free running multivibrator, which, as such, is not desired in this invention. Binary counting operation is provided in the circuit of this invention by the addition of a capacitor to absorb this "kick-back" pulse which is produced by the fall of the flux alignment in the core from saturation to remanence of the same polarity. Instead of the transistor switch being closed to provide the unwanted multivibrator action, the capacitor provides the means whereby the circuit comes to rest and the core remains at the state of remanence provided by the driving signal. A battery connected so as to buck or absorb the "kick-back" pulse is equally effective to afford operation in lieu of the capacitor.

Upon the receipt of a second suitable driving signal, the flux alignment in the core will change to the other state of remanence and the circuit will come to rest and remain inoperative until the receipt of a third suitable driving signal. This is the desired binary counting circuit operation.

The circuit includes rectangular hysteresis loop magnetic core 10 with control windings 17 and 21 and center tapped driving winding 18, 19 thereon, as well as output winding 25. The two p-n-p junction transistors 11 and 12 are provided with the collectors thereof connected to opposed ends of winding 18, 19. The emitters of the transistors 11 and 12 are joined at junction 24. The base of transistor 11 is connected to one end of control winding 17 and the base of transistor 12 is connected to one end of the control winding 21. The other end of winding 17 is connected to the other end of control winding 21 through junction 14. Input 13 is connected to junction 14. Connected between junctions 14 and 24 are resistors 15 and capacitor 22. Junction 24 is connected to a common ground at 23. Connected between center tap 20 and junction 24 is power source 16. The negative side of the power source 16 is connected to the center tap 20 and the positive side of the power source 16 is connected to the junction 24. A typical output winding 25 is shown with output terminals 26 and 27 therefor.

By convention, a positive potential at the dotted end of a core winding induces positive magnetizing force in the core.

It will be recognized that the circuit presented in the drawing would be a free running multivibrator generating a square wave output should the capacitor 22 be removed.

With the core 10 at negative remanence, for example, and with the polarities shown in the drawing, a negative input pulse of the proper magnitude at input 13 is applied to the bases of transistors 11 and 12 through control windings 17 and 21, respectively, cutting on both transistors. It would appear that the circuit would not operate with both transistor switches closed. However, upon the passage of current from power source 16 through junction 24, transistor 11 and winding 18 as well as through transistor 12 and winding 19, the tendency of the flux alignment in core 10 is to change from negative remanence toward positive saturation. Such change is provided by the positive current passing through winding 18. As a result, a negative potential is applied to the base of p-n-p transistor switch 11 maintaining it closed, or cut-on, condition. A positive potential is also induced at the dotted end of winding 21 and such positive potentail is applied to the base of p-n-p transistor switch 12 to open it; that is, cut it off. The circuit remains in this condition of operation until core 10 is saturated in a positive sense. Upon saturation, no further potential is induced in the windings and the transistor 11 is opened. The fall of flux alignment from positive saturation to positive remanence is capable of inducing sufficient negative potential in winding 21 to cut on transistor switch 12 and, as a result, permit the current through winding 19 to drive the flux alignment in the core to negative saturation. However, capacitor 22 across terminals 12 and 14 absorbs the pulse which would otherwise cut on transistor 12 and, therefore, transistor 12 remains cut off. Transistor 11 could not have cut on since a negative pulse is not available at the base thereof.

The second negative input pulse at in put 13 is applied instantaneously to the bases of both transistors cutting on both of them. Since the flux alignment of the core is now at positive remanence, the tendency of the flux alignment in core 10 is to change toward negative saturation. Such change is provided by the current passing through drive winding 19. As a result, a negative potential is induced at the dotted end of control winding 21 and such negative potential is applied to the base of p-n-p transistor switch 12 maintaining it on. A positive potential is also induced at the not-dotted end of winding 17 and such positive potential is applied to the base of p-n-p transistor switch 12 to open it. The circuit remains in this condition of operation until core 10 is saturated in a negative sense. Upon saturation, no further potential is induced in the windings and the transistor 12 is opened. The fall of flux alignment from negative saturation to negative remanence induces a pulse which is absorbed by capacitor 22. The circuit comes to rest and remains inactive until the receipt of a third negative input pulse.

So it is seen that for every two input pulses, the flux alignment in core 10 changes from remanence of one polarity to remanence of the opposite polarity and then back to the original polarity. An output of one positive pulse and one negative pulse across terminals 26 and 27 results from two remanence changes. Therefore, two input pulses of like polarity produce two output pulses of unlike polarity; which is the desired binary counting operation.

It is obvious that the polarity of the power source 16 can be reversed and n-p-n transistors substituted for the p-n-p transistors 11 and 12 to provide no change in the operation of the circuit.

In a typical circuit, the core 10 is of material such as Deltamax, which comprises: 50% nickel and 50% iron. The number of turns in windings 17 and 21 to windings 18 and 19 will be from a 10 to 1 ratio to a 5 to 1 ratio. The power source is a 3 or 6 volt battery. Resistor 15 has a resistance of 2200 ohms. Capacitor 22 has a capacitance of .03 microfarad. These values are typical but not critical. Although magnetic cores with rectangular hysteresis loop characteristics are discussed in this specification, it has been found that cores of other materials are operative.

Obviously many modifications and variations of the present invention are possible in the light of the above teachings. It is, therefore, to be understood that within the scope of the appended claims, the invention may be practiced otherwise than specifically described.

What is claimed is:

1. A binary counting circuit comprising a pair of switching transistors each having emitter, base, and collector terminals, a magnetic core having rectangular loop hysteresis characteristics, an output winding, a center tapped winding and a pair of control windings on said core, a source of direct current energy connected between the center tap of said center tapped winding and a common connection of the emitter terminals of said transistors, the ends of said center tapped winding being connected respectively to the collector terminals of said transistors, an input terminal for said counting circuit, said input terminal being serially connected through a different control winding to the base electrode of each of said transistors, said control windings being polarized to couple changes in flux in said core to their respective base electrodes as control signals of opposite polarity, and means for absorbing the inductive kickback induced in the control windings when the core falls from saturation to remanence whereby self regeneration in the circuit is prevented.

2. In a binary counting circuit; a magnetic core having rectangular hysteresis loop characteristics, a first winding on said core having first and second end connections and a center connection, second and third windings on said core each having first and second end connections, a power source including two terminals, an input terminal, means connecting said center connection to one of said terminals, first and second transistors each having a collector, a base and an emitter, means connecting the emitters to the other of said terminals at a first junction, means connecting the first end connection of said first winding to the collector of the first transistor, means connecting the second end connection of said first winding to the collector of the second transistor, means for connecting the second end connection of the second winding to the base of the first transistor, means for connecting the first end connection of the third winding to the base of the second transistor, means for connecting the first end connection of the second winding to the second end connection of the third winding and to the input terminal at a second junction, a resistance means and a capacitance means connected in parallel between said first and second junctions.

References Cited in the file of this patent

UNITED STATES PATENTS

| | | |
|---|---|---|
| 2,709,225 | Pressman | May 24, 1955 |
| 2,772,370 | Bruce et al. | Nov. 27, 1956 |
| 2,838,686 | Eckert | June 10, 1958 |
| 2,903,601 | Schneider | Sept. 8, 1959 |